E. M. COOK.
CLUTCH MEMBER.
APPLICATION FILED SEPT. 17, 1906.

930,270.

Patented Aug. 3, 1909.

Witnesses

Inventor
E. M. Cook,
By Victor J. Evans
Attorney

UNITED STATES PATENT OFFICE.

EDWARD M. COOK, OF OBERLIN, OHIO.

CLUTCH MEMBER.

No. 930,270.  Specification of Letters Patent.  Patented Aug. 3, 1909.

Application filed September 17, 1906. Serial No. 334,857.

*To all whom it may concern:*

Be it known that I, EDWARD M. COOK, a citizen of the United States of America, residing at Oberlin, in the county of Lorain and State of Ohio, have invented new and useful Improvements in Clutch Members, of which the following is a specification.

This invention relates to clutch members designed especially for use in conjunction with belt pulleys for fixing the latter on a driving shaft, and has for its objects to produce a comparatively simple inexpensive device of this character which may be readily installed for use, one which may be conveniently manipulated for clutching or releasing the pulley, and one whereby the pulley may be securely fixed for rotation with the shaft when circumstances require.

With these and other objects in view, the invention comprises the novel features of construction and combination of parts more fully hereinafter described.

Figure 1:
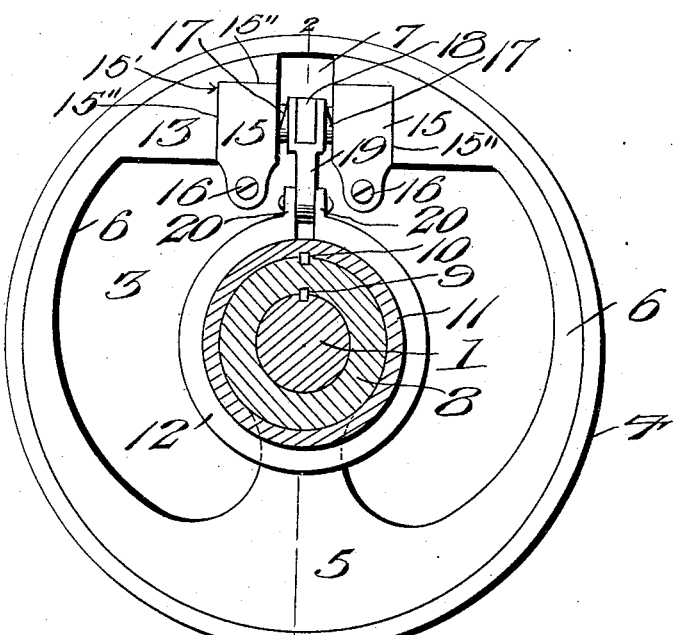
Figure 2:
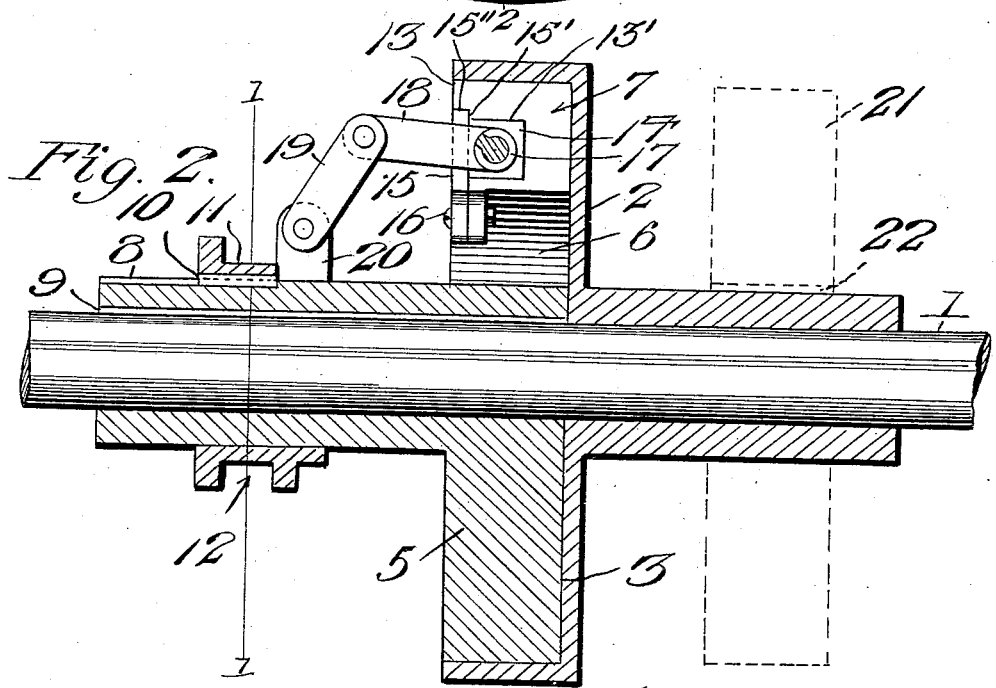
Figure 3:
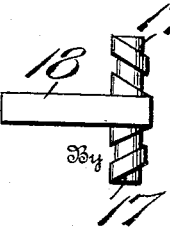

In the accompanying drawings: Figure 1 is a front sectional elevation of a device embodying the invention, the section being taken on the line 1—1 of Fig. 2. Fig. 2 is a vertical cross section taken on the line 2—2 of Fig. 1. Fig. 3 is a detail view of the clutch operating screw.

Referring to the drawings, 1 designates a power shaft on which is idly mounted a drum or pulley 2 of hollow formation presenting an annular chamber 3 bounded by a marginal or peripheral wall 4 constituting the belt receiving surface of the pulley.

Fitted in the chamber 3 is a clutch member or head 5 having a pair of relatively movable spring clutching portions or arms 6 terminally spaced as at 7 and provided with a cylindrical, tubular hub 8 fixed on the shaft 1 through the medium of a spline or feather 9, while slidably disposed on the hub 8 and fixed for rotation therewith through the medium of a spline or feather 10 is an operating head or collar 11 provided with a peripheral groove or channel 12 permitting engagement of a suitable operating lever with the collar.

Formed at the ends of the spring clutch portions or arms 6 are heads or enlargements 13 having non-circular recesses 13' for the reception of internally threaded nuts 14 retained in place by means of cap plates 15 in turn secured through the medium of screw bolts 16. The plates are disposed in shallow recesses 15' in the front surfaces of the heads, and the right-angularly disposed walls 15'' of the shallow recesses engage the plates and thus coöperate with the screw bolt 16 to hold the plates firmly in position over the nuts 14. Engaged with the nuts 14 are the reversely threaded portions 17 of a rotary expanding member or screw provided with a fixed outwardly projecting crank portion or arm 18 to the outer end of which there is pivoted one end of a connecting element or link 19 having its other end pivoted between a pair of ears 20 formed on the collar 11.

In practice, when the collar 11 is moved forwardly on the hub 8, the arm 18 will, through the medium of link 19, be swung upwardly thereby rotating the expanding member or screw for causing the threaded portions 17 to act in conjunction with the nuts 14 for spreading the arms 6 relatively and forcing them into secure clutching engagement with the marginal wall 4 of the pulley, thus to fix the latter for rotation with the shaft 1. It will be understood, of course, that reverse movement of the collar 11 on the hub serves for rotating the screw in the opposite direction, thereby drawing the portions 6 of the clutch head toward each other for releasing the pulley, and further, that the parts 17 of the screw are threaded in relatively reverse directions whereby they operate in conjunction with the nuts 14 for moving the clutch arms 6 toward and from each other on proper rotation of the screw.

The present construction admits of a ready adjustment to compensate for wear of the spring members 6. It is merely necessary to remove the plates 15 and withdraw the screw 17 and nuts 14 forwardly and turn the nuts a quarter, half or three-quarter turn, and replace them in the recesses and restore the plates 15. By thus changing the relation of the nuts 14 with the screw 17, the members 6 can be spread so that the clutch will be set by the regular movement of the part 12.

When necessary or desirable, an additional belt pulley 21 may be arranged on the hub of the pulley 2 and fixed for rotation therewith by means of a spline 22, as illustrated in Fig. 2.

By arranging the nuts 14 in recesses in the manner set forth and retaining the nuts in position by the plates 15, it is possible to readily replace the nuts or operating screw without entirely dismantling the clutch.

For this purpose, it is merely necessary to remove the pivot between the parts 18 and 19 and unfasten the bolts 16 for permitting the plates 15 to be taken out, whereupon the operating screw with the nuts thereon can be removed forwardly. New nuts can then be applied to the screw or a new screw substituted in case of wear or breakage, and the parts reassembled in a simple and expeditious manner.

Having thus described my invention, what I claim is:

An apparatus of the character described comprising a shaft with a drum thereon, a clutch member provided with a hub having arms, said arms provided with terminal enlargements having polygonal recesses therein which are open at one side and also at the end faces thereof, said enlargements being also provided with recesses of a less depth and of a greater area than the polygonal recesses and arranged in alinement therewith, internally threaded nuts fitting in the said polygonal recesses and removable in a direction parallel with the axis of and through said recesses of less depth and greater area, and having cap plates fitted therein to hold the said nuts in position, bolts for securing said cap plates, a rotary expanding member having reversely threaded portions engaged by said nuts and provided with a crank arm having one end of a link pivoted thereto, a collar slidably mounted on the hub having means thereon to which the other end of said link is pivoted, whereby said arms and their enlargements are permitted to frictionally engage the internal surfaces of the drum.

In testimony whereof, I affix my signature in presence of two witnesses.

EDWARD M. COOK.

Witnesses:
CHARLES S. HAMMOND,
WILLIS A. HART.